(12) United States Patent
Kreuzer

(10) Patent No.: US 6,437,265 B1
(45) Date of Patent: Aug. 20, 2002

(54) ARRANGEMENT WITH DEVICE FOR ALIGNING TWO ADJACENT PARTS

(75) Inventor: Martin Kreuzer, Kleinwallstadt (DE)

(73) Assignee: TRW Automotive Safety Systems GmbH & Co. KG, Aschaffenburg (DE)

( * ) Notice: Subject to any disclaimer, the term of this patent is extended or adjusted under 35 U.S.C. 154(b) by 0 days.

(21) Appl. No.: 09/675,606

(22) Filed: Sep. 29, 2000

(30) Foreign Application Priority Data

Sep. 30, 1999 (DE) ..................................... 299 17 214 U

(51) Int. Cl.⁷ ................................................ H01H 9/00
(52) U.S. Cl. ...................................... 200/61.54; 74/552
(58) Field of Search ............................ 280/728.2, 731; 200/61.54, 61.55; 74/552

(56) References Cited

U.S. PATENT DOCUMENTS 5,335,743 A * 8/1994 Gillbrand et al. ........... 180/178
5,520,066 A * 5/1996 Tueri ........................ 74/484 R
5,909,892 A * 6/1999 Richardson .................. 280/477
6,257,615 B1 * 7/2001 Bohn et al. ............... 280/728.2
6,349,616 B1 * 2/2002 Onodera et al. ......... 200/61.54

FOREIGN PATENT DOCUMENTS

DE 19718979 11/1998
DE 29906377 7/1999

* cited by examiner

Primary Examiner—Paul N. Dickson
Assistant Examiner—Faye M. Fleming
(74) Attorney, Agent, or Firm—Tarolli, Sundheim, Covell, Tummino & Szabo L.L.P.

(57) ABSTRACT

The invention relates to an arrangement to be secured to a base part of a vehicle. The arrangement comprises first and second parts to be secured to the base part in sequence and adjacent and aligned to each other, and a device for aligning the first and second parts to each other. The first part is to be secured to the base part before the second part. The device has at least one protuberance on the first part extending toward the second part. The protuberance features an alignment bevel configured relative to the second part such that it is contacted by the second part during assembling of the first and second parts to the base part.

12 Claims, 1 Drawing Sheet

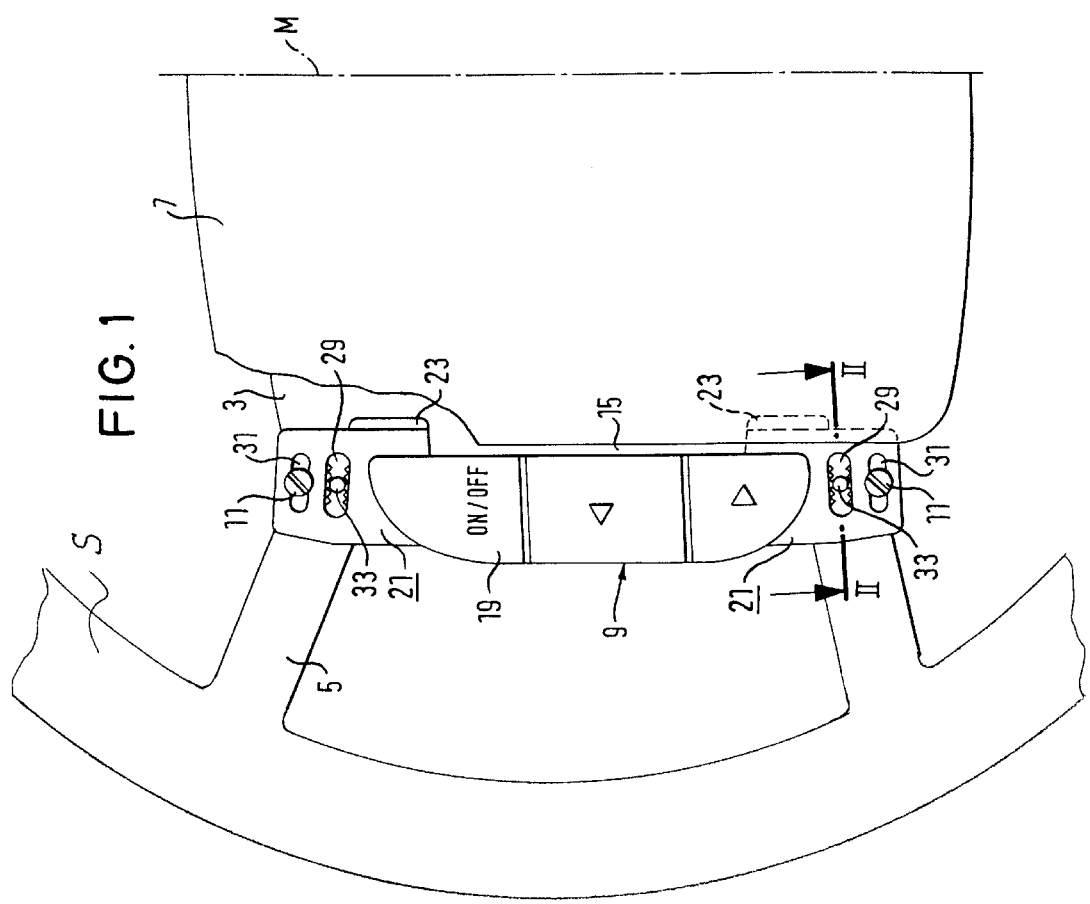
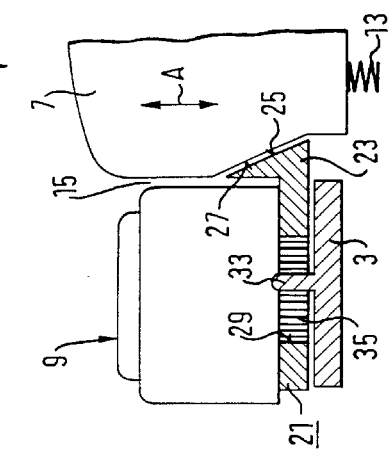

ARRANGEMENT WITH DEVICE FOR ALIGNING TWO ADJACENT PARTS

TECHNICAL FIELD

The invention relates to an arrangement to be secured to a base part of a vehicle. Specifically, the invention relates to a steering wheel to which a gas bag module and a multifunction switch are secured adjacent to each other.

BACKGROUND OF THE INVENTION

When two parts need to be secured in sequence and adjacent to each other to a base, i.e. a vehicle part, and not to be secured to each other, these parts must be precisely aligned to each other when required to define a gap between them. Otherwise, namely, the gap would result unevenly which always gives rise to complaints and is a sign of shoddy assembly. A gap between adjacent parts is especially necessary when at least one of the two parts also needs to be movable when the vehicle is in operation. In particular, the invention relates to an arrangement having a device for aligning a multifunction switch on the vehicle steering wheel to a gas bag module to be fitted directly adjoining the switch to the front side of the steering wheel hub. As mentioned above, the invention relates more particularly to a steering wheel including a multifunction switch which is to be arranged directly adjacent to the gas bag module. For this purpose the multifunction switch is first secured to the steering wheel hub since the gas bag module partly conceals the switch. In many embodiments the gas bag module is also movable in the direction of the centerline of the steering wheel since it has to be depressed in actuating the horn. In fitting the multifunction switch and the gas bag module misalignment of the parts to each other may occur, resulting in the gap being uneven, i.e. partly too large or too small which may give rise to complaints.

BRIEF SUMMARY OF THE INVENTION

The invention provides an arrangement with a device for aligning two adjacent, first and second parts to be secured in sequence to a base part of a vehicle, which permits speedy, facilitated fitting and ensures a uniform, small gap between the parts. The arrangement according to the invention comprises first and second parts to be secured to the base part in sequence and adjacent and aligned to each other, and a device for aligning the first and second parts to each other. The first part is to be secured to the base part before the second part. The device has at least one protuberance on the first part extending toward the second part. The protuberance features an alignment bevel configured relative to the second part such that it is contacted by the second part during assembling of the first and second parts to the base part.

According to the preferred embodiment according to which the arrangement comprises multifunction switch, the switch has a protuberance with an alignment bevel which faces the direction in which the module is fitted, i.e. facing the centerline direction and being inclined thereto. When the gas bag module is inserted contact always occurs between the module and the aligning surface area, via which the multifunction switch is shifted and located spaced away from the gas bag module before the multifunction switch is finally screwed to the steering wheel hub. The multifunction switch thus has a protuberance molded thereto which aligns directly with the gas bag module by coming into contact therewith.

So that the directions in which the multifunction switch—when shifted on contact with the gas bag module—are defined, preferably at least one guide is provided which receives the first part, i.e. the multifunction switch, and which permits shifting of the latter relative to the second part, i.e. to the gas bag module and away therefrom. This guide is preferably a guiding elongated hole in or in the vicinity of the protuberance itself into which a finger on the base part, i.e. the steering wheel hub protrudes.

Fitting and aligning the multifunction switch to the gas bag module is further facilitated in that in accordance with the preferred embodiment a resistance element is provided which maintains the first part in the aligned position prior to the second part being fitted. This is intended to exclude the possibility of the first part being applied in an undefined position on the base part before it is shifted by the second part. The shift is presented a resistance by the resistance element so that contact is always provided in fitting the second part. Finally, the resistance element maintains the first part in the aligned condition which can then be secured, e.g. screwed, by the fitter in the aligned position on the base part without requiring him to fix it in position by any additional means or by hand.

The resistance element is preferably a latching or ratchet connection, a latching element (e.g. a finger) engaging a toothing. This toothing may be configured in the elongated hole which thus has a dual function by it serving both to guide the first part and fix it in position.

The resistance element may also be achieved exclusively by a press-fit, by—for example—an oversize finger protruding into the elongated hole.

BRIEF DESCRIPTION OF THE DRAWINGS

FIG. 1 is a plan view on the left-hand half of a steering wheel according to the invention in the region of the hub comprising the arrangement according to the invention with a gas bag module and a multifunction switch secured to the hub, the right-hand half being configured symmetrical thereto and the multifunction switch and switch being equipped with a special device for aligning, and FIG. 2 is a section through the multifunction switch and gas bag module taken along the line II—II in FIG. 1 showing the arrangement and the device in more detail.

DETAILED DESCRIPTION OF THE PREFERRED EMBODIMENT

Referring now to FIG. 1 there is illustrated part of a steering wheel comprising a steering wheel hub 3, spokes 5 starting therefrom and a steering wheel rim S shown in sections. Secured to the steering wheel hub 3 is a gas bag module 7 which constitutes a closed receptacle containing a gas bag and an inflator. The gas bag module 7 is secured by screws or a latching connection on its underside (the side facing the steering wheel hub 3) to the hub. Arranged to the left and right of the gas bag module 7 (only the left-hand half being evident from FIG. 1) is a multifunction switch 9 which is likewise secured to the steering wheel hub 3 by screws 11.

Referring now to FIG. 2 there is illustrated the gas bag module 7 mounted shiftable by a small amount in the axial direction A since it can be depressed to actuate the vehicle horn. In this arrangement a spring 13 permanently urges the gas bag module into the starting position, away from the steering wheel hub, which by the way is shown only in sections in FIG. 2.

The multifunction switch 9 directly adjoins the gas bag module 7 and is separated therefrom only by a narrow, constant gap. This gap 15 has a uniform width over its full visible run, this being achieved by a device for aligning the multifunction switch 9 relative to the gas bag module 7. This device comprises two one-piece supporting feet 21 molded to the housing 19 of the multifunction switch 9 which are concealed in the fitted condition by a separate cover. These supporting feet 21 comprise in turn protuberances 23 facing the gas bag module 7 and extending below the gas bag module 7 (cf. FIG. 2). The gas bag module 7, the multifunction switch 9 and the device define an arrangement to be secured to the steering wheel.

The supporting feet 21 are provided at the ends of the elongated multifunction switch 9, so that the support and alignment of the multifunction switch 9 is improved by the spacing of the fastener screws 11 and the protuberances 23 from each other being selected as large as possible. The protuberances 23 extend, as said, toward the gas bag module 7 and upwards at their free end (cf. FIG. 2), they each comprising an alignment bevel 25 directing upwards and outwardly from the centerline M. This alignment bevel 25 runs parallel to an alignment bevel 27 in the region of the lower end of the gas bag module 7. The alignment bevel 25 is positioned so that it also faces the fitting direction R of the gas bag module. The gas bag module 7 is always mounted and fitted in axial direction, i.e. on to the steering wheel hub 3 from above.

The device comprises not only the protuberance 23 and the two alignment bevels 25, 27 but also guides in the form of elongated holes 29 in the supporting feet 21. These extend substantially transversely to the longitudinal extension of the gap 15. Provided at the side of each elongated hole 29 is a further elongated hole 31 through which the screws 11 extend. Protruding upwards from the steering wheel hub 3 in the region of each elongated hole 29 is a latching element in the form of a finger which protrudes through the elongated hole 29. The finger too, is a part of the device for aligning the multifunction switch 9 relative to the gas bag module 7. On its inner side the elongated hole 29 has in the region of its longitudinal sides a toothing 35, the teeth of which run parallel to the finger 33 which defines a part of the arrangement. This toothing together with the finger 33 forms a resistance element in the form of a latching connection. Finger 31 and elongated hole 29 are adapted to each other with regard to their dimensions such that between the two a press-fit exists, i.e. the finger 33 is squeezed by the longitudinal sides of the elongated hole 29.

Fitting and aligning the multifunction switch 9 and gas bag module 7 to the steering wheel hub 3 and relative to each other will now be explained.

The multifunction switch 9 forms the part to be fitted first. The multifunction switch 9 is placed on the finger 33 in such a manner that the multifunction switch 9 would actually be arranged too near to the gas bag module 7 later to be fitted. Due to the press-fit and due to the latching connection the provisional position of the multifunction switch 9 still to be aligned is maintained so that the fitter requires no additional fitting aids or equipment. Next, the gas bag module 7 is placed from above in the direction R onto the steering wheel hub 3 and e.g. screwed from the rear to the steering wheel hub. In so doing, the gas bag module 7 is urged as far as it will go downwards against the force of the spring 13. This action automatically results in the two alignment bevels 25, 27 coming into contact at each end of the multifunction switch 9. Due to the movement of the gas bag module 7 in the direction R the multifunction switch 9 is automatically shifted uniformly outwards and exactly aligned relative to the gas bag module 7. Once the lowest position of the gas bag module 7 is attained the multifunction switch 9 has also attained its final fitted position. Subsequently the gas bag module 7 is released again and the spring 12 urges it upward so that the two alignment bevels 25, 27 are slightly spaced away from each other, as shown in FIG. 2. This outwards shift of the multifunction switch 9 is counteracted by the resistance element in the form of the latching connection formed by the finger, toothing and elongated hole. The finger 23 latches in place between two other teeth in the shifting action of the multifunction switch 9. In the final position this latching connection arrests alignment of the multifunction switch 9. It is in this position that the fastener screws 11 are then fully tightened.

The gap 15 is thus always the same from one vehicle to the next and always has the same width along its extent.

From without the protuberance 23 is not visible since the gas bag module 7 protrudes outwardly at its side facing away from the steering wheel hub 3 which forms a base part and conceals the protuberance 23 including the alignment bevel 25.

Fitting the part to be assembled first (multifunction switch 9) and the part to be subsequently fitted secondly (gas bag module 7) may, of course, also be done in that first the gas bag module 7 is fixedly connected to the steering wheel hub 3. Accordingly, the gas bag module 7 is then only able to move toward the arrow A and is urged upward by the spring 13. The multifunction switch 9 is then pressed laterally against the gas bag module 7 until the alignment bevels 25, 27 come into contact with each other. Finally, the gas bag module 7 is then pressed downwards, as a result of which the multifunction switch 9 is urged outwards into its final position in which it can then be fixedly screwed to the steering wheel hub 3.

What is claimed is:

1. An arrangement to be secured to a base part of a vehicle, said arrangement comprising:
    first and second parts secured to said base part in sequence and adjacent and aligned to each other, and
    a device for aligning said first and second parts to each other,
    said device having at least one protuberance on said first part extending toward said second part,
    said protuberance including an alignment bevel configured relative to said second part such that it is contacted by said second part during assembling of said first and second parts to said base part, at least a portion of said base part being part of said arrangement, said base part being a hub of a vehicle steering wheel, said first part being a multifunction switch and said second part being a gas bag module arranged spaced away from said multifunction switch by a small uniform gap, said gas bag module being fitted on a front side of said hub.

2. The arrangement as set forth in claim 1, wherein said alignment bevel faces one of a securing and movement direction of said second part in an assembled condition.

3. The arrangement as set forth in claim 1, wherein said at least one guide is provided which receives said first part and which permits a shift of said first part toward said second part and away therefrom.

4. The arrangement as set forth in claim 1, wherein a resistance element is provided which maintains said first part in a non-aligned position prior to securing said second part, which permits a shift of said first part on assembly of said second part, which permits a shift in contacting said alignment bevel, and which counteracts shifting of said aligned first part by a resistance.

5. The arrangement as set forth in claim 4, wherein said resistance element is a latching connection.

6. The arrangement as set forth in claim 1, wherein said second part on a side facing away from said base part, protrudes toward said protuberance and conceals at least said alignment bevel.

7. The arrangement as set forth in claim 1, wherein said second part comprises an alignment bevel which is in contact with said alignment bevel of said first part during fitting and extends parallel thereto.

8. An arrangement to be secured to a base part of a vehicle, said arrangement comprising:

first and second parts secured to said base part in sequence and adjacent and aligned to each other, and a device for aligning said first and second parts to each other, said device having at least one protuberance on said first part extending toward said second part, said protuberance including an alignment bevel configured relative to said second part such that it is contacted by said second part during assembling of said first and second parts to said base part, at least one guide being provided which receives said first part and which permits a shift of said first part toward said second part and away therefrom, said guide including an elongated hole arranged in the vicinity of said protuberance.

9. An arrangement to be secured to a base part of a vehicle, said arrangement comprising:

first and second parts secured to said base part in sequence and adjacent and aligned to each other, and a device for aligning said first and second parts to each other, said device having at least one protuberance on said first part extending toward said second part, said protuberance including an alignment bevel configured relative to said second part such that it is contacted by said second part during assembling of said first and second parts to said base part, a resistance element being provided which maintains said first part in a non-aligned position prior to securing said second part, which permits a shift of said first part on assembly of said second part, which permits a shift in contacting said alignment bevel, and which counteracts shifting of said aligned first part by a resistance, said guide including an elongated hole arranged in the vicinity of said protuberance, said resistance element being designed as a finger protruding into said elongated hole and being received in said elongated hole by a press-fit.

10. An arrangement to be secured to a base part of a vehicle, said arrangement comprising:

first and second parts secured to said base part in sequence and adjacent and aligned to each other, and a device for aligning said first and second parts to each other, said device having at least one protuberance on said first part extending toward said second part, said protuberance including an alignment bevel configured relative to said second part such that it is contacted by said second part during assembling of said first and second parts to said base part, a resistance element being provided which maintains said first part in a non-aligned position prior to securing said second part, which permits a shift of said first part on assembly of said second part, which permits a shift in contacting said alignment bevel, and which counteracts shifting of said aligned first part by a resistance, said resistance element being a latching connection, said latching connection being formed by a toothing, a latching element being provided engaging said toothing, said toothing and said latching element being provided on one of said first part and said base part.

11. The arrangement as set forth in claim 10, wherein said guide comprises an elongated hole arranged in the vicinity of said protuberance and wherein said toothing is provided in said elongated hole of said guide, and wherein said latching element is a finger protruding into said elongated hole.

12. An arrangement to be secured to a base part of a vehicle, said arrangement comprising:

first and second parts secured to said base part in sequence and adjacent and aligned to each other, and a device for aligning said first and second parts to each other, said device having at least one protuberance on said first part extending toward said second part, said protuberance including an alignment bevel configured relative to said second part such that it is contacted by said second part during assembling of said first and second parts to said base part, said base part being a vehicle steering wheel having a hub defining a base plate, said first part being a multifunctional switch and said second part being a gas module and said switch and said module being spaced from each other in an assembled state of said steering wheel by a gap.

* * * * *